United States Patent
Chang et al.

(10) Patent No.: US 7,352,162 B1
(45) Date of Patent: Apr. 1, 2008

(54) PWM BOOST SYSTEM AND START-UP METHOD THEREOF

(75) Inventors: Yung Ching Chang, Hsinchu (TW); Yen Kuo Lo, Hsinchu (TW); Wen Chia Pi, Hsinchu (TW)

(73) Assignee: Advanced Analog Technology, Inc., Hsinchu (TW)

( * ) Notice: Subject to any disclaimer, the term of this patent is extended or adjusted under 35 U.S.C. 154(b) by 0 days.

(21) Appl. No.: 11/621,519

(22) Filed: Jan. 9, 2007

(30) Foreign Application Priority Data

Sep. 18, 2006  (TW) .............................. 95134401 A

(51) Int. Cl.
*G05F 1/40* (2006.01)
*H02M 7/10* (2006.01)

(52) U.S. Cl. ...................... 323/290; 323/284; 323/285; 323/901; 363/49

(58) Field of Classification Search ........ 323/222–225, 323/282, 285, 290, 901, 908, 284; 363/49
See application file for complete search history.

(56) References Cited

U.S. PATENT DOCUMENTS

| 4,974,141 | A  | * | 11/1990 | Severinsky et al. | ......... 323/224 |
| 6,879,137 | B2 | * | 4/2005  | Sase et al.       | ................. 323/282 |
| 7,298,117 | B2 | * | 11/2007 | Hasegawa et al.   | .......... 323/222 |

* cited by examiner

*Primary Examiner*—Jessica Han
(74) *Attorney, Agent, or Firm*—Egbert Law Offices

(57) ABSTRACT

A PWM (pulse width modulation) boost system includes a boost circuit, a voltage dividing circuit, a comparator, a PWM circuit, a pre-oscillator, and a current limit circuit. A start-up method of the PWM boost system includes (1) providing an error voltage; (2) generating a PWM signal according to the error voltage; (3) controlling a switch in a boost circuit with the PWM signal, so as to control an inductor current flowing through a boost inductor in the boost circuit; (4) charging a capacitor in the boost circuit with the inductor current, wherein charges stored in the capacitor define a DC output voltage; and (5) providing a feedback voltage according to the DC output voltage to adjust the error voltage.

14 Claims, 5 Drawing Sheets

PWM BOOST SYSTEM AND START-UP METHOD THEREOF

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a pulse width modulation (PWM) boost system and a start-up method thereof. More particularly, the present invention relates to a PWM boost system with a function of current limit soft-start and a start-up method thereof.

2. Description of Related Art Including Information Disclosed Under 37 CFR 1.97 and 37 CFR 1.98.

FIG. 1 shows a conventional PWM boost system 1, which includes a boost circuit 10, a pulse width modulation circuit (PWM circuit) 11, a pre-oscillator 12, a comparator 13, a voltage dividing circuit 14, and a stabilizing circuit 15. FIGS. 2(a) and 2(b) are diagrams of relevant signals when an output voltage Vout of the PWM boost system 1 is connected to a light load and a heavy load, respectively. Signals $V_{out}$, $V_{EO1}$, and $I_{L1}$ stand for a DC output voltage of the PWM boost system 1, a voltage on a node EO1 connecting the comparator 13 and the PWM circuit 11 (i.e., an error voltage), and an inductor current flowing through a boost inductor L1 in the boost circuit 10, respectively. The stabilizing circuit 15 includes a resistor R3 and a capacitor C2 strung between the node EO1 and a ground terminal.

Referring to FIG. 2(a), when the PWM boost system 1 is started, a reference voltage $V_{ref}$ is applied on a non-inverting input terminal of the comparator 13, while an inverting input terminal of the comparator 13 is connected to a feedback voltage $V_{FB}$ from the voltage dividing circuit 14, so as to define the magnitude of the DC output voltage $V_{out}$. When the DC output voltage $V_{out}$ is lower than a first predetermined voltage $V_{uvlo}$ (undervoltage lockout voltage) (i.e., in a pre-oscillation period), the pre-oscillator 12 outputs a pre-oscillation signal $S_{OSC}$ to the PWM circuit 11 to generate a PWM signal $S_{PWM}$. It should be noted that during pre-oscillation period, the comparator 13 does not output a signal (i.e., the level of $V_{EO1}$ is 0). The PWM signal $S_{PWM}$ is used to change the turn-on or turn-off time of a switch SW1, such that the inductor current $I_{L1}$ generated by a first voltage $V_{in}$ and flowing through the boost inductor L1 charges a capacitor C1 intermittently, and the charges stored in the capacitor C1 can generate the DC output voltage $V_{out}$. Here, the diode D1 limits a discharging direction of the capacitor C1. After entering a PWM period, the DC output voltage $V_{out}$ is maintained at the first predetermined voltage $V_{uvlo}$ for a period of time. When the DC output voltage $V_{out}$ increases, an inrush current is generated with the inductor current $I_{L1}$, and the inductor current $I_{L1}$ does not decline until the DC output voltage $V_{out}$ reaches a second predetermined voltage $V_{ref} \times DIV$, where $DIV=(R1+R2)/R2$.

Referring to FIG. 2(b), the operation of FIG. 2(b) during pre-oscillation period is the same as that of FIG. 2(a). However, after the pre-oscillation period is terminated, as the output of the PWM boost system 1 is connected to a heavy load, the signal $V_{EO1}$ continues switching between two operating modes of the pre-oscillation period and a PWM period, and thus an appropriate PWM signal $S_{PWM}$ cannot be generated by the PWM circuit 11. As a result, the DC output voltage $V_{out}$ continues oscillating about the first predetermined voltage $V_{uvlo}$, and cannot reach the second predetermined voltage $V_{ref} \times DIV$ (i.e., the PWM boost system 1 cannot be started up successfully).

BRIEF SUMMARY OF THE INVENTION

One aspect of the present invention is to provide a PWM boost system, which adds a current limit circuit and a comparator enabled in a pre-oscillation period according to an enable signal, so as to eliminate an inrush current when the PWM boost system is started up with a light load, and to ensure a successful start-up when the PWM boost system is connected to a heavy load.

Another aspect of the present invention is to provide a start-up method of a PWM boost system, which limits an inductor current flowing through a boost inductor and enables a comparator during a pre-oscillation period, so as to eliminate an inrush current when the PWM boost system is started up with a light load, and to ensure a successful start-up when the PWM boost system is connected to a heavy load.

The present invention discloses a PWM boost system, which includes a boost circuit including a boost inductor, a voltage dividing circuit, a comparator, a PWM circuit, a pre-oscillator, and a current limit circuit. The boost circuit increases a first voltage to generate a DC output voltage. The voltage dividing circuit uses the DC output voltage to generate a feedback voltage. The comparator is used to compare a reference voltage and the feedback voltage to generate an error voltage. The PWM circuit receives the error voltage to generate a PWM signal to control the boost circuit. The pre-oscillator generates a pre-oscillation signal to the PWM circuit in a pre-oscillation period. The current limit circuit controls an inductor current flowing through the boost inductor. Here, the pre-oscillation period is as the period when the DC output voltage is lower than a first predetermined voltage, and the PWM period is as the period when the DC output voltage is higher than the first predetermined voltage.

The present invention further discloses a start-up method of a PWM boost system, which includes (1) providing an error voltage; (2) generating a PWM signal according to the error voltage; (3) controlling a switch in a boost circuit with the PWM signal, so as to control an inductor current flowing through a boost inductor in the boost circuit; (4) charging a capacitor in the boost circuit with the inductor current, wherein charges stored in the capacitor define a DC output voltage; and (5) providing a feedback voltage according to the DC output voltage to adjust the error voltage. A pre-oscillation period is as the period when the DC output voltage is lower than a first predetermined voltage, a PWM period is the period when the DC output voltage is higher than the first predetermined voltage, and the error voltage is generated during pre-oscillation period by actuation of an enable signal.

BRIEF DESCRIPTION OF THE SEVERAL VIEWS OF THE DRAWINGS

The invention will be described according to the appended drawings.

DETAILED DESCRIPTION OF THE INVENTION

Figure 3:
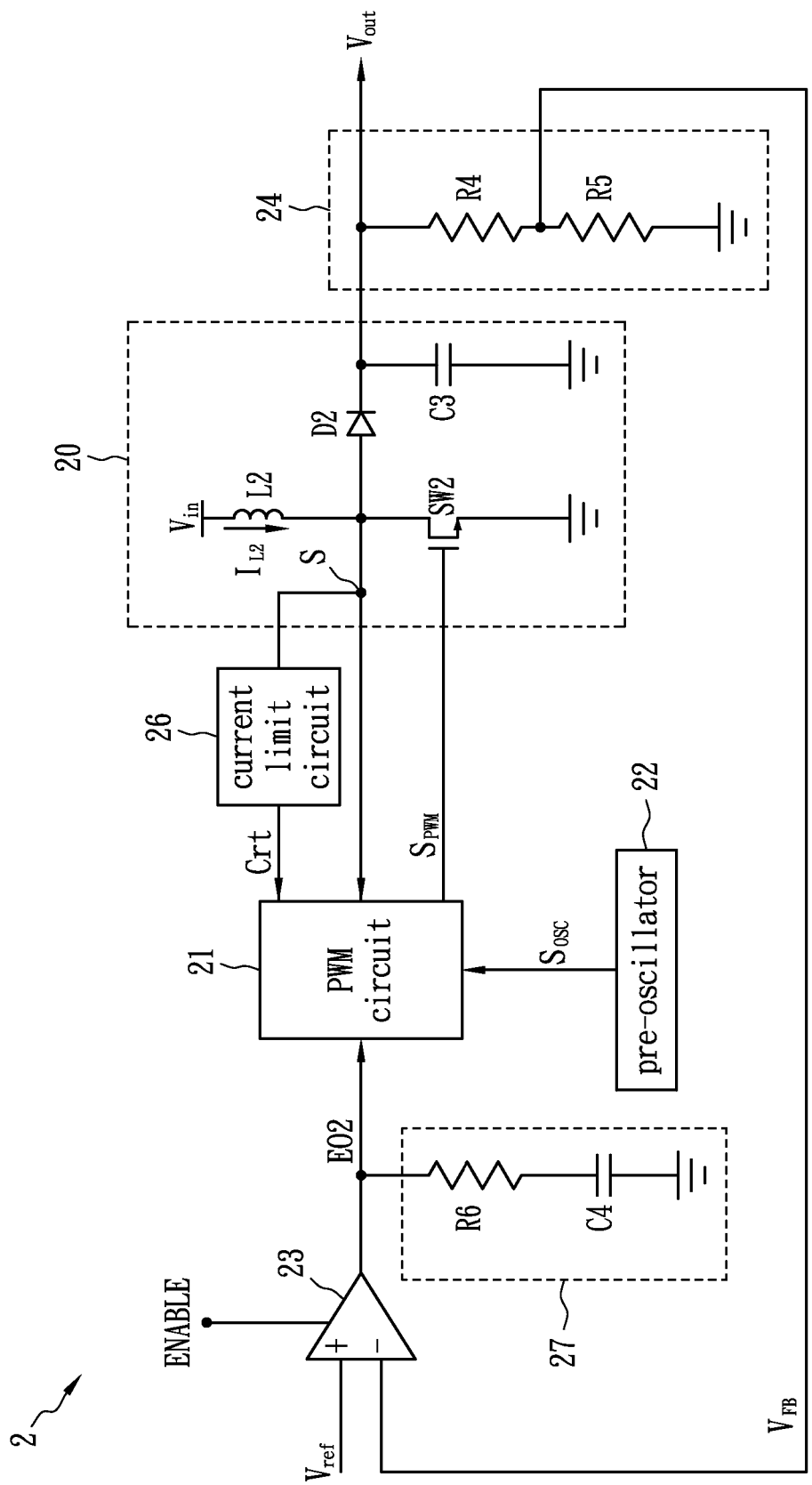
FIG. 3 is a schematic view of a PWM boost system of the present invention.
Figure 4B:
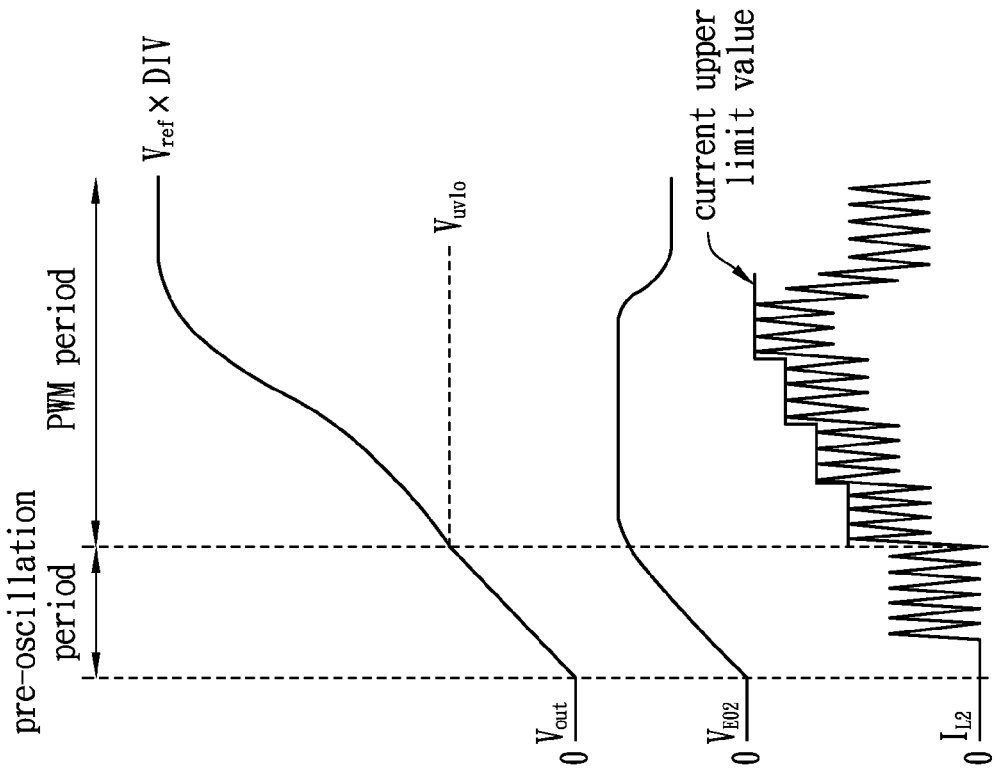
FIGS. 4(a) and 4(b) are diagrams of relevant signals when the output voltage of FIG. 3 is connected to a light load and a heavy load respectively.
Figure 4A:
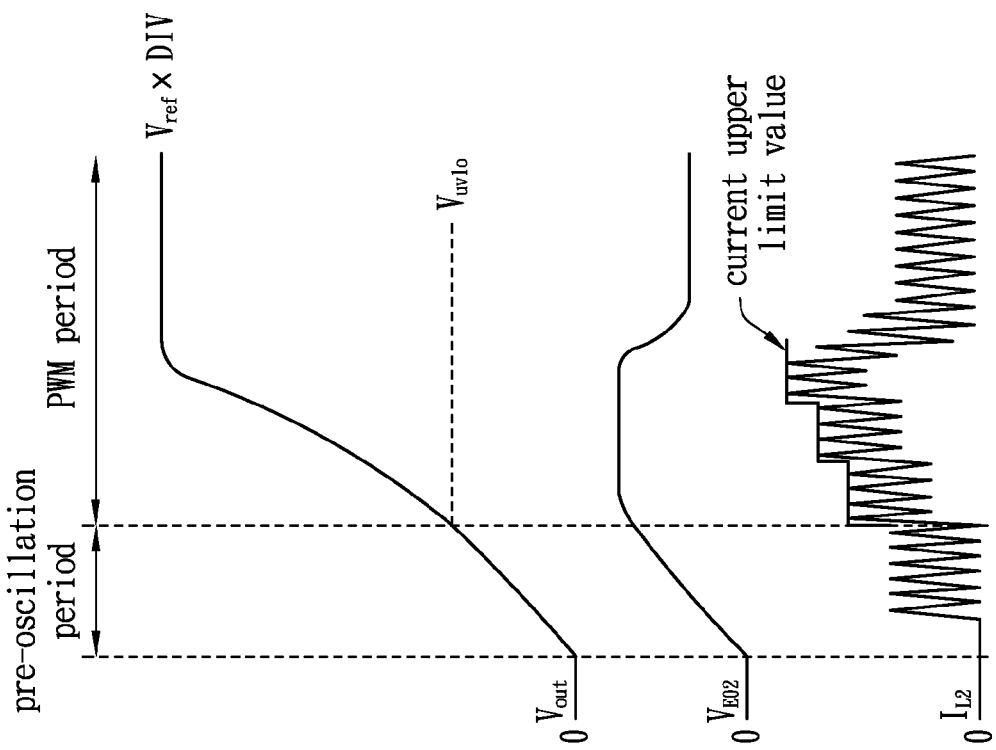

FIG. 3 is a schematic view of a PWM boost system 2 of the present invention, and FIGS. 4(a) and 4(b) are diagrams of relevant signals when the output voltage $V_{out}$ of the PWM boost system 2 of the present invention is connected to a light load and a heavy load, respectively. The PWM boost system 2 includes a boost circuit 20 including a boost inductor L2, a voltage dividing circuit 24, a comparator 23, a PWM circuit 21, a pre-oscillator 22, a current limit circuit 26, and a stabilizing circuit 27. The boost circuit 20 includes a boost inductor L2 connected to a first voltage $V_{in}$, a switch SW2 connected in series with the boost inductor L2, a diode D2 connected to the boost inductor L2 and the switch SW2, and a capacitor C3 connected between the diode D2 and a ground terminal. The charges stored in the capacitor C3 are used to generate the DC output voltage $V_{out}$. The boost circuit 20 charges the capacitor C3 intermittently by controlling the turn-on time of the switch SW2, so as to increase the first voltage $V_{in}$ to generate the DC output voltage $V_{out}$. The voltage dividing circuit 24 of this embodiment includes a first resistor R4 connected to the diode D2 and a second resistor R5 connected between the first resistor R4 and the terminal ground. The voltage dividing circuit 24 uses the DC output voltage $V_{out}$ to generate a feedback voltage $V_{FB}$. When the DC output voltage $V_{out}$ is lower than a first predetermined voltage (i.e., during pre-oscillation period), an enable signal ENABLE enables the comparator 23 to compare a reference voltage $V_{ref}$ with the feedback voltage $V_{FB}$, so as to generate an error voltage $V_{EO2}$ (i.e., the voltage on a node EO2). The PWM circuit 21 receives the error voltage $V_{EO2}$ to generate a PWM signal $S_{PWM}$ to control the boost circuit 20. The pre-oscillator 22 generates a pre-oscillation signal SOSC to the PWM circuit 21 in a pre-oscillation period. The current limit circuit 26 controls an inductor current $I_{L2}$ flowing through the boost inductor L2. The stabilizing circuit 27 includes a resistor R6 and a capacitor C4 strung between the node EO2 and the ground terminal. Here, a period when the DC output voltage $V_{out}$ is lower than the first predetermined voltage (the undervoltage lockout voltage $V_{uvlo}$ in this example) is defined as the pre-oscillation period, and a period when the DC output voltage is higher than the first predetermined voltage is defined as a PWM period.

Figure 5:
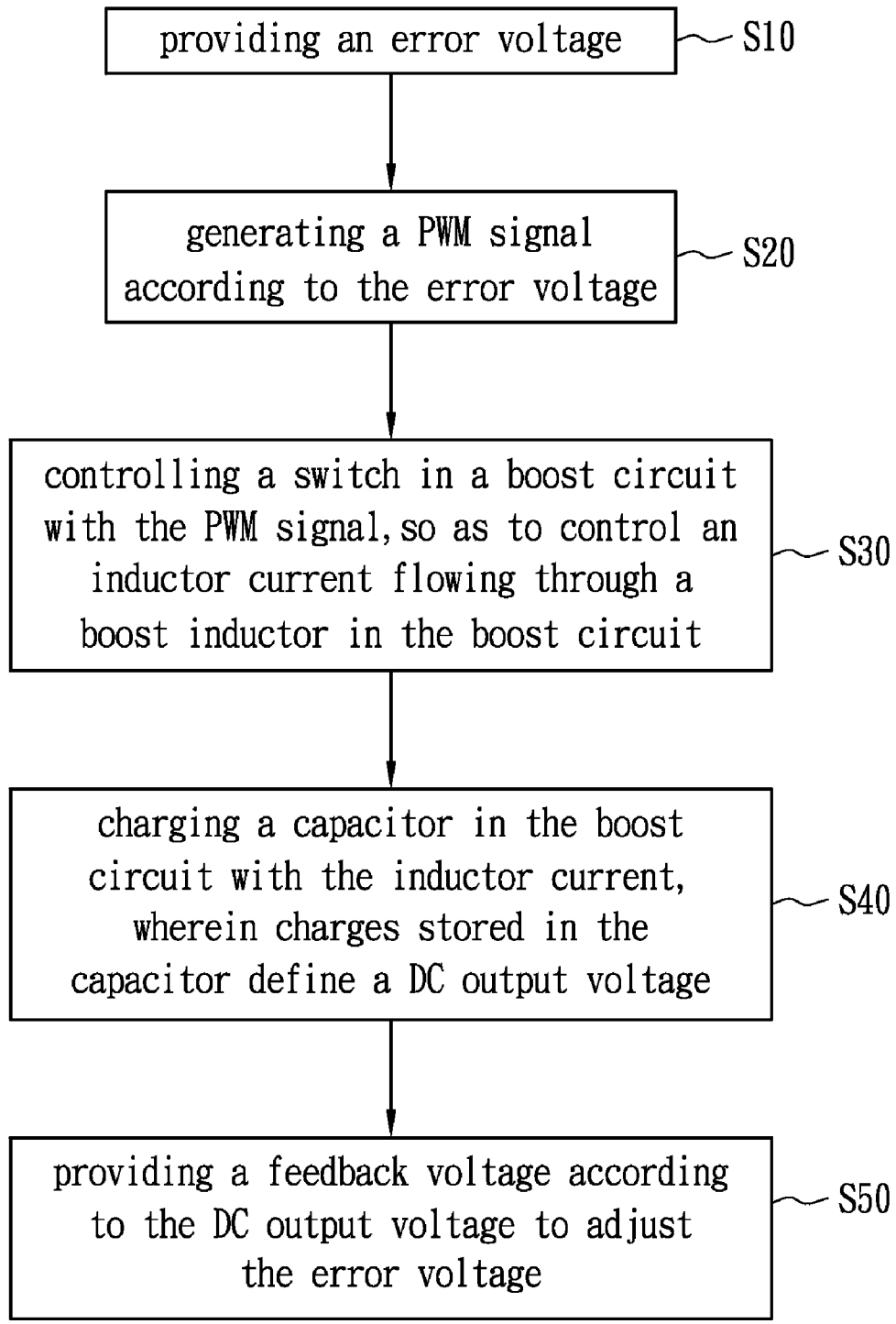
FIG. 5 is a flow chart of a start-up method of the PWM boost system of FIG. 3.

FIG. 5 is a flow chart of a start-up method of the PWM boost system 2 of FIG. 3. First, an error voltage $V_{EO2}$ is provided (Step S10). Referring to FIGS. 4(a) and 4(b), during pre-oscillation period, the enable signal ENABLE enables the comparator 23 to generate the error voltage $V_{RO2}$, and meanwhile, the pre-oscillator 22 also generates a pre-oscillation signal $S_{OSC}$. The PWM circuit 21 then generates a PWM signal $S_{PWM}$ according to the pre-oscillation signal $S_{OSC}$ (Step S20). Then, the PWM signal $S_{PWM}$ controls the turn-on time of the switch SW2 in the boost circuit 20, so as to control an inductor current $I_{L2}$ flowing through a boost inductor L2 in the boost circuit 20 (Step S30). Then, the inductor current $I_{L2}$ is used to charge a capacitor C3 in the boost circuit 20, and the charges stored in the capacitor C3 define the DC output voltage $V_{out}$ (Step S40). When the DC output voltage $V_{out}$ is higher than the first predetermined voltage $V_{uvlo}$ (i.e., entering the PWM period), the inductor current L2 increases accordingly. At this time, the current limit circuit 26 uses a node S to sense the inductor current $I_{L2}$, and then limits the inductor current $I_{L2}$ within a current upper limit value. Finally, the current limit circuit 26 sends a control signal Crt back to the PWM circuit 21 according to the result of limiting the inductor current $I_{L2}$, So as to adjust the PWM signal $S_{PWM}$. It should be noted that during PWM period, the PWM signal $S_{PWM}$ is generated according to the error $V_{EO2}$ together with a carrier signal in the PWM circuit 21. Here, the current upper limit value is adjusted with time. In this embodiment, the current upper limit value increases stepwise until reaching a rated current upper limit value. Then, according to the DC output voltage $V_{out}$, the voltage dividing circuit 24 provides a feedback voltage $V_{FB}$ to the comparator 23 where the feedback voltage $V_{FB}$ is compared with a reference voltage $V_{ref}$, so as to adjust the error voltage $V_{RO2}$ (Step S50).

Figure 1:
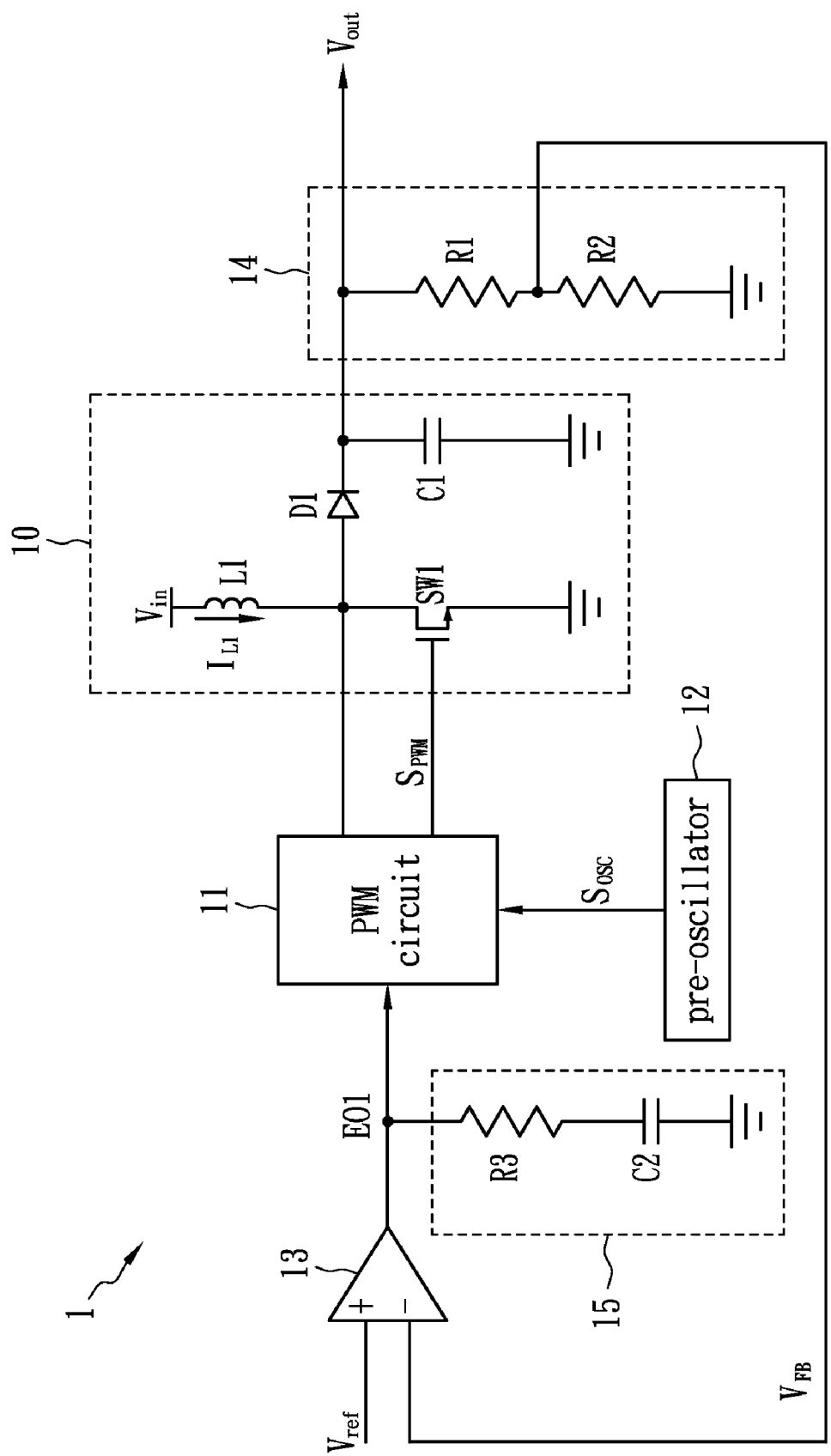
FIG. 1 illustrates a schematic view of a conventional PWM boost system.
Figures 2A, 2B:
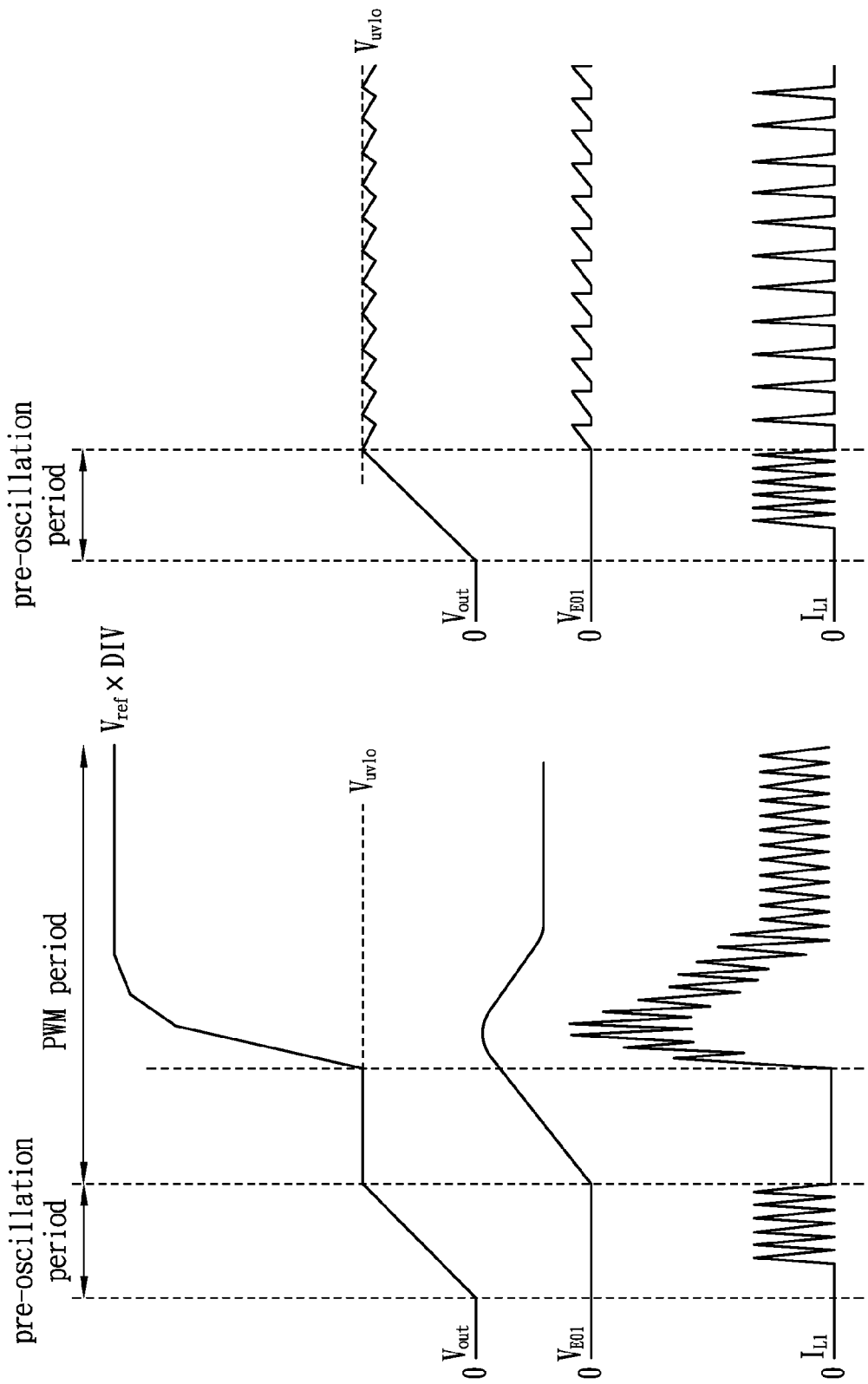
FIGS. 2(a) and 2(b) are diagrams of relevant signals when the output voltage of FIG. 1 is connected to a light load and a heavy load respectively.

Comparing FIG. 4(a) with FIG. 2(a) and FIG. 4(b) with 2(b), the DC output voltage generated by the PWM boost system of the present invention can increase with the time to a second predetermined voltage in both the pre-oscillation period and the PWM period regardless of whether a light load or a heavy load is connected, avoiding the problem with the DC output voltage stopping at the first predetermined voltage (as shown in FIG. 2(a)) or oscillating about the first predetermined voltage (as shown in FIG. 2(b)). In addition, by the use of the current limit circuit, the problem of inrush current can be solved effectively. Therefore, the PWM boost system and the start-up method thereof of the present invention realize the desired purposes of eliminating the rush current when starting up with a light load and achieve successful start-up when a heavy load is connected.

The above-described embodiments of the present invention are intended to be illustrative only. Numerous alternative embodiments may be devised by those skilled in the art without departing from the scope of the following claims.

We claim:

1. A pulse width modulation (PWM) boost system, comprising:
    a boost circuit comprising a boost inductor, wherein said boost circuit increases a first voltage to generate a DC output voltage;
    a voltage dividing circuit configured to generate a feedback voltage with said DC output voltage;
    a comparator configured to compare a reference voltage with said feedback voltage in a PWM period to generate an error voltage;
    a PWM circuit configured to receive said error voltage to generate a PWM signal to control said boost circuit;

a pre-oscillator configured to generate a pre-oscillation signal to said PWM circuit in a pre-oscillation period; and a current limit circuit configured to control an inductor current flowing through said boost inductor;

wherein a pre-oscillation period is a period when said DC output voltage is lower than a first predetermined voltage, and wherein a PWM period is a period when said DC output voltage is higher than said first predetermined voltage.

2. The PWM boost system of claim 1, wherein said boost circuit further comprises:

a switch connected in series with said boost inductor, wherein a turn-on time of said switch is controlled by a PWM signal;

a diode connected to a connection point of said boost inductor and said switch; and a capacitor connected between said diode and a ground terminal to generate said DC output voltage.

3. The PWM boost system of claim 2, wherein the said voltage dividing circuit comprises:

a first resistor connected to said diode; and a second resistor connected between said first resistor and said ground terminal, wherein said feedback voltage is acquired at a connection point of said first resistor and said second resistor.

4. The PWM boost system of claim 1, wherein said DC output voltage has a level increasing with time to a second predetermined voltage in said PWM period following said pre-oscillation period.

5. A start-up method of a PWM boost system, comprising the steps of:

providing an error voltage;

generating a PWM signal according to said error voltage;

controlling a switch in a boost circuit with said PWM signal, so as to control an inductor current flowing through a boost inductor in said boost circuit;

charging a capacitor in said boost circuit with said inductor current, wherein charges stored in said capacitor define a DC output voltage; and providing a feedback voltage according to said DC output voltage to adjust said error voltage;

wherein a pre-oscillation period is a period when said DC output voltage is lower than a first predetermined voltage, and wherein a PWM period is a period when said DC output voltage is higher than said first predetermined voltage.

6. The start-up method of the PWM boost system of claim 5, wherein the step of adjusting the error voltage comprises the step of comparing the feedback voltage with a reference voltage.

7. The start-up method of the PWM boost system of claim 5, wherein the error voltage is generated by a comparator.

8. The start-up method of the PWM boost system of claim 7, wherein the comparator is enabled by an enable signal in the pre-oscillation period.

9. The start-up method of the PWM boost system of claim 5, wherein the error voltage increases with time during the pre-oscillation period.

10. The start-up method of the PWM boost system of claim 5, wherein the PWM signal is generated according to a pre-oscillation signal during the pre-oscillation period.

11. The start-up method of the PWM boost system of claim 5, wherein the PWM signal is generated according to the error voltage together with a carrier signal inside a PWM circuit during the PWM period.

12. The start-up method of the PWM boost system of claim 5, wherein the DC output voltage increases with time to a second predetermined voltage during the PWM period.

13. The start-up method of the PWM boost system of claim 5, wherein the step of controlling the said inductor current comprises:

sensing said inductor current;

limiting said inductor current with a current upper limit value; and adjusting said PWM signal according to a result of limiting said inductor current.

14. The start-up method of the PWM boost system of claim 13, wherein the current upper limit value is adjusted with time.

* * * * *